Patented Apr. 10, 1934

1,954,769

UNITED STATES PATENT OFFICE 1,954,769

TREATING MILK PRODUCTS

John F. Lyman, Columbus, Ohio, assignor to M & R Dietetic Laboratories, Inc., a corporation of Ohio No Drawing. Application December 8, 1930, Serial No. 500,981

10 Claims. (Cl. 99—11)

The present invention relates to improvements in the treatment of milk products, more particularly to effect a change or adjustment of the calcium phosphate ratios to adapt them for use in the preparation of infants' food, milk sugar and the like.

In the readily available milk products derived particularly from cow's milk, such as skim milk, whey, and the like, the proportions of calcium and phosphates are excessively large for the proper utilization of the products in many ways. Thus, in the preparation of readily digestible milk products and infants' food, the comparatively large proportions of calcium and phosphates in skim milk tends to the production of large curds which are not readily digestible or assimilable, and when the skim milk is employed in the preparation of such products, it may lead to serious digestive disorders. Similarly whey contains constituents such as its sugar of milk and albumen which are highly desirable as constituents of food products, but the whey cannot be employed for certain purposes because of the effects of its unduly large calcium and phosphate ion ratios. Similarly the large calcium and phosphate content of milk products from cows and other animals must be reduced in the production of products simulating human milk in their composition.

I have found that both the calcium and phosphate ion ratios of such milk products, particularly those derived from cow's milk, may be reduced by contacting the liquid milk products with base-exchange silicates, such as those which are commonly used in softening water; for example, zeolites, glauconite and artificial zeolitic materials, such as those commonly known in the trade as "permutit", "refinite", etc. In accordance with this invention, the liquid milk product, such as skim milk, whey or the like, in slightly acid condition, is brought into contact with the base exchange silicate, either by percolation, filtration, or by simple admixture, and on removal therefrom, its proportion both of CaO and $P_2O_5$ is decreased to a substantial extent. The extent of decrease may be controlled by regulating the relative proportions of the base exchange silicate to the milk product and the acidity of the latter.

For example, in the preparation of a skim milk for use in the production of a compounded infants' food, I have secured the following results:

The skim milk may vary in its proportion of CaO from 0.181 per cent to 0.203 per cent and in its proportion of $P_2O_5$ from 0.221 to 0.258 per cent. The skim milk is treated with any suitable base exchange silicate, such as glauconite, the proportion of the latter being in general in excess of 20 per cent by weight of wet glauconite to the milk. Contact is maintained either during the mixing process or during percolation of the milk through the glauconite to secure the full effects of the latter, from fifteen minutes upwards being, in general, required. Acidity of the milk of at least 0.15 per cent and preferably exceeding 0.2 per cent (calculated as lactic acid) is maintained, if necessary, slight additions of hydrochloric or other acid, such as lactic or pure sulfuric acid, being made to compensate for the neutralizing action of the silicate employed. On removal of the treated skim milk, a substantial reduction in CaO and $P_2O_5$ content of the milk is found to have taken place.

In a specific case, a skim milk containing 9.40 per cent total solids, 0.1919 per cent CaO and 0.2403 per cent $P_2O_5$ was mixed with glauconite which had been wet and drained, in the proportions of about 620 parts by weight of the skim milk to about 360 parts by weight of the wet sand. The original acidity of the skim milk was 0.16. The acidity was reduced by the action of the glauconite and sufficient concentrated hydrochloric acid was added to bring the acidity to above 0.25 per cent and preferably to 0.285 per cent (calculated as lactic acid). After forty-five minutes contact, the milk was drawn off. The total solids were reduced somewhat by dilution with the water originally present in the sands. When calculated back to a total solid basis of 9.40 per cent, equivalent to that of the original skim milk, the proportion of CaO was found to have been reduced to 0.1289 per cent and the proportion of $P_2O_5$ to 0.1671 per cent.

By reducing the acidity of the milk during its contact with the base exchange silicate or by reducing the relative proportion of the latter used, the extent of reduction of CaO and $P_2O_5$ content is lowered. Thus with one-half the above proportion of the base exchange silicate, the other conditions being maintained the same, the proportions of CaO and $P_2O_5$ were reduced to 0.1604 and 0.1833 per cent respectively. By reduction of the acidity to 0.20 per cent or lower, likewise, a substantially lower removal of CaO and $P_2O_5$ is secured, the extent thereof being approximately one-third and one-half respectively those under the conditions above set forth.

The invention may likewise be employed upon other milk products. For example, in the preparation of compounded, easily digestible products it has hitherto been necessary to build up the carbohydrate ratio by the use of prepared sugar of milk. By the use of the present invention in reducing the CaO and $P_2O_5$ ratios of whey, it is possible to use the latter as a means of supplying sugar of milk in such products and at the same time take advantage of the residual protein matter in the form of albumen which is contained therein. It will likewise be readily apparent that the present invention may be used in reducing the $P_2O_5$ content of aqueous solutions generally by providing or supplying in such solutions small proportions of soluble alkaline earth compounds to supply calcium or magnesium ions therein to convert the base exchange silicate from the alkali metal type to the alkaline earth metal type or by employing in the operation a base exchange silicate which has already been converted to the alkaline earth metal type or to the iron or aluminum type. The hydrogen form of the base exchange silicate may also be used.

After use in accordance with the present invention, the base exchange silicate may be revivified by successive treatments with alkali metal hydroxides and an alkali metal halide. For example, the spent sands from an operation as above described, in order to revivify them, are washed with soft water; then contacted with an aqueous solution of caustic alkali, such as sodium hydroxide, containing one-fourth pound per gallon or more. Less may be used at times when smaller proportions of $P_2O_5$ are adsorbed. They are again washed with soft water and contacted with the usual alkali metal salt revivifying solution; for example, an aqueous solution containing one and one-half to two pounds of NaCl per gallon. It is readily apparent that the strength of the revivifying solutions may be widely varied and that much stronger solutions may be used if desired, in order to successively replace the $P_2O_5$ ion with the OH ion and subsequently restore the alkali metal ion, the latter in accordance with the usual practice in revivifying base exchange silicates used in softening water.

By the use of the present invention, the complicated chemical methods involving double decomposition, formation of colloid gels and difficult centrifuging operations as hitherto employed in reducing the calcium and phosphate ion proportions of such products are avoided. At the same time the necessary reduction in these constituents is secured to prevent the formation of large and difficultly assimilable curds from the treated products or the compounds in which they are incorporated, and the curds formed on digestion of the treated liquid milk products, such as skim milk, milk, whey or the like are small, soft and readily assimilable.

The invention may also be used in the preparation of milk and milk products for evaporation, cheese making, and the like.

I claim:

1. The method of reducing the proportion of calcium and phosphate ions in liquid milk products which comprises contacting the same with a base exchange silicate.

2. The method of reducing the proportion of calcium and phosphate ions in liquid milk products which comprises contacting such products with a base exchange silicate while maintaining the milk product in acid state.

3. The method of reducing the proportion of calcium and phosphate ions in liquid milk products which comprises contacting such products with an alkali metal type of base exchange silicate while maintaining the acidity of the milk product at least at 0.20 per cent (calculated as lactic acid).

4. The method of reducing the calcium and phosphate ion content of skim milk which comprises contacting it with a base exchange silicate.

5. The method of reducing the calcium and phosphate ion content of skim milk which comprises contacting it with a base exchange silicate while maintaining the skim milk in acid state.

6. The method of reducing the calcium and phosphate ion content of skim milk which comprises contacting it with an alkali metal type of base exchange silicate, while maintaining the acidity of the skim milk at least at 0.20 per cent (calculated as lactic acid).

7. The method of decreasing the calcium and phosphate ion content of whey which comprises contacting the whey with a base exchange silicate.

8. The method of decreasing the calcium and phosphate ion content of whey which comprises contacting the whey with a base exchange silicate while maintaining the whey in acid state.

9. The method of reducing the proportions of calcium and phosphate ions in liquid milk products by means of a spent base exchange silicate, which comprises subjecting said base exchange silicate to the action of a solution of caustic alkali and of a solution of alkali metal salt and subsequently contacting the milk product therewith while maintaining the milk product in acid state.

10. The method of reducing the proportions of calcium and phosphate ions in liquid milk products by means of a base exchange silicate having previously been contacted with a milk product, which comprises subjecting said base exchange silicate successively to the action of a solution of caustic alkali and of a solution of alkali metal salt and again contacting it with the liquid milk product from which the calcium and phosphate ions are to be removed.

JOHN F. LYMAN.